United States Patent
Freisler et al.

(10) Patent No.: US 11,945,393 B2
(45) Date of Patent: Apr. 2, 2024

(54) FOOT PROTECTION DEVICE

(71) Applicants: ZF AUTOMOTIVE GERMANY GMBH, Alfdorf (DE); Audi AG, Ingolstadt (DE)

(72) Inventors: Werner Freisler, Schwäbisch Gmünd (DE); Markus Schlipf, Göppingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/631,093

(22) PCT Filed: Jul. 30, 2020

(86) PCT No.: PCT/EP2020/071493
§ 371 (c)(1),
(2) Date: Jan. 28, 2022

(87) PCT Pub. No.: WO2021/019009
PCT Pub. Date: Feb. 4, 2021

(65) Prior Publication Data
US 2022/0250575 A1   Aug. 11, 2022

(30) Foreign Application Priority Data

Jul. 31, 2019   (DE) .................... 10 2019 120 627.8

(51) Int. Cl.
*B60R 21/231*   (2011.01)
*B60R 21/206*   (2011.01)
*B60R 21/00*    (2006.01)

(52) U.S. Cl.
CPC .......... *B60R 21/231* (2013.01); *B60R 21/206* (2013.01); *B60R 2021/0046* (2013.01);
(Continued)

(58) Field of Classification Search
CPC .......... B60R 2021/23176; B60R 2021/23107; B60R 2021/0046; B60R 2021/23169; B60R 21/231; B60R 21/206
See application file for complete search history.

(56) References Cited

U.S. PATENT DOCUMENTS

| | | | | |
|---|---|---|---|---|
| 3,047,088 A | * | 7/1962 | Murrell | G05G 1/60 |
| | | | | D12/174 |
| 6,217,059 B1 | * | 4/2001 | Brown | B60R 21/16 |
| | | | | 280/730.2 |

(Continued)

FOREIGN PATENT DOCUMENTS

| | | | |
|---|---|---|---|
| CN | 205131174 U | * | 4/2016 |
| DE | 19727598 A1 | | 1/1999 |

(Continued)

OTHER PUBLICATIONS

PCT International Search Report for corresponding International Application Serial No. PCT/EP2020/071493, dated Sep. 16, 2020, pp. 1-4.

*Primary Examiner* — Keith J Frisby
(74) *Attorney, Agent, or Firm* — TAROLLI, SUNDHEIM, COVELL & TUMMINO L.L.P.

(57) ABSTRACT

A foot protection device for a driver (34) of a vehicle including pedals comprises an inflatable first airbag (40) located beneath at least one pedal (10, 12) which, in the inflated state, extends between a bulkhead (24) delimiting the footwell and the associated pedal (10, 12). The first airbag (40) in the inflated state and in a lateral view extends from the bulkhead (24) to the front side of the pedal (10, 12) and laterally encloses the pedal (10, 12) to prevent the foot from bending.

14 Claims, 1 Drawing Sheet

(52) U.S. Cl.
CPC .............. *B60R 2021/23107* (2013.01); *B60R 2021/23176* (2013.01)

(56) References Cited

U.S. PATENT DOCUMENTS

| | | | | |
|---|---|---|---|---|
| 2001/0017454 A1* | 8/2001 | Bayley | ................ | B60R 21/2338 280/728.1 |
| 2002/0185847 A1* | 12/2002 | Khoudari | .............. | B60R 21/231 280/730.1 |
| 2016/0016527 A1* | 1/2016 | Aselage | ................ | B60R 21/235 29/428 |

FOREIGN PATENT DOCUMENTS

| | | | |
|---|---|---|---|
| DE | 10039661 | A1 | 3/2001 |
| DE | 10046886 | A1 | 6/2001 |
| DE | 10024810 | A1 | 11/2001 |
| DE | 102015104116 | A1 | 10/2015 |
| JP | 2005324608 | A * | 11/2005 |

* cited by examiner

FOOT PROTECTION DEVICE

RELATED APPLICATIONS

This application is a U.S. National Stage Application filed under 35 USC 371, claiming priority to Ser. No. PCT/EP2020/071493, filed on 30 Jul. 2020; which claims priority from German Patent Application DE 10 2019 120 627.8, filed 31 Jul. 2019, the entireties of which are hereby incorporated herein by reference.

TECHNICAL FIELD

The invention relates to a foot protection device for a driver of a vehicle that includes pedals, comprising an inflatable first airbag provided beneath a pedal which, in the inflated state, is positioned between a bulkhead delimiting the footwell and the associated pedal.

BACKGROUND

Airbags of this type serve for preventing, in the event of crash, the foot or feet of the occupant from getting between the pedals and the bulkhead or between the pedals and the floor of the vehicle.

SUMMARY

It is the object of the invention to protect the feet and legs of the occupant even better.

This is achieved in a foot protection device of the above-mentioned type in that the first airbag extends, in the inflated state and in a lateral view, from the bulkhead to the front side of the pedal and encloses the pedal on the side.

As the first airbag extends also laterally up to the front side of the pedal, the feet of the occupant have no step between the pedal and the airbag at which they might bend in the case of restraint. As a result, an as homogenous restraining surface as possible is formed which improves the protection of the lower extremities, in particular the lower legs, the ankle joints and the feet. The invention improves in particular the protection in the so-called comfort position of the occupant, when the seat is largely reclined. This comfort position is adopted, for example, in autonomous or automated driving.

The foot protection device according to the invention avoids twisting of the feet, it dampens the impact of the feet and, as will be illustrated in detail in the following, avoids straightening of the feet by providing a heel run-on surface. The invention increases the safety in a measurable manner not only for a 50% dummy, but also for a 5% dummy and a 95% dummy.

The invention can be configured so that the first airbag is inflated only when a comfort position is detected, wherein the invention need not be restricted thereto, however.

Alternatively, the airbag is released independently of the presence of the comfort position, i.e., it is also released in a normal position of the occupant.

The first airbag may be associated with and laterally enclose plural pedals, when it is completely inflated. As an alternative to this, plural first airbags are provided.

For providing an as homogenous support surface as possible and for preventing, or at least largely preventing, the associated pedal or pedals from being moved by the deploying first airbag, the first airbag can have an indentation adapted to the shape of the respective pedal which receives and embeds the respective pedal in the inflated state.

There are various options to constructively produce said indentation. It is one option to provide the front wall of the airbag with darts and/or to arrange tethers or intermediate walls inside the airbag for connecting the front wall to the rear wall.

Optionally, the indentations may be configured so that the airbag touches the pedal or forms at least one support surface for the pedal when, during the impact, the occupant's foot is placed on the pedal or hits the pedal. In this way, yielding of the pedal at all or considerably in the case of restraint is prevented or at least reduced.

Speaking more generally, the first airbag in the inflated state extends to the pedal or pedals so far that it contacts the latter on the rear side and supports the pedals.

Another option of the invention provides the first airbag to extend to forward of the associated pedal or pedals so as to cover the front side thereof. Hence, the airbag does not terminate, as mentioned before, laterally with the front side of the pedal (more precisely the pedal tread of the pedal plates) but covers the front side thereof. During inflation, the airbag thus comes from behind and encompasses the pedal and its pedal tread. This variant is intended to ensure that the support surface formed by the airbag extends as homogenously as possible, i.e., without any steps, major indentations or bulges.

The first airbag can make available either solely or with the front side of the pedal or pedals altogether a step-free supporting wall for the feet of the occupant.

Another embodiment of the invention provides a second airbag to be arranged in the vehicle so that it is positioned in the inflated state between an instrument panel upwardly delimiting the footwell and a foot of the driver resting on the associated pedal. The second airbag serves for preventing the foot and the lower leg from swinging upward in the case of restraint, in particular when the first airbag is inflated or the bulkhead is deformed in the direction of the passenger cabin. Then the foot and, thus, the lower leg of the occupant could be abruptly moved upwards.

The second airbag which is positioned behind and above the pedals in the driving direction can reduce or prevent such upward swinging movement.

The second airbag may either be a separate airbag, for example having a separate gas source or a separate fluid communication with a joint gas source which provides gas for inflation also for the first airbag, or said second airbag is in fluid communication with the first airbag and basically forms a separate chamber that is in fluid communication with the chamber defining the first airbag.

The second airbag is arranged, for example, in the region of the transition of the ceiling portion of the instrument panel upwardly delimiting the footwell to a front side of the instrument panel facing obliquely upwards in the direction of the knee of the driver. In this transition, the second airbag is supported when it is inflated.

In the completely inflated state, the second airbag may have such a volume that it contacts a foot of the driver resting on the associated pedal and is moreover supported by the instrument panel in the area of its upper side. In this way, the foot or the feet is/are positioned even better.

Moreover, also a third airbag may be provided which extends from the first airbag along the floor and ensures a so-called heel run-on surface. This means that in the comfort position the heel is still spaced apart from the third airbag so that during impact the heel slides forward. It is delimited very early by the third airbag, because it "runs on", that is, hits the third airbag.

One option provides that the third airbag downwards is adjacent to the first airbag and, together with the same, forms a homogenous, viz. almost flat support surface designed without any steps. An alternative option provides that the third airbag extends farther to the associated seat than the first airbag. Thus, when viewed from the side, a kind of bead is imparted to the support surface, said bead starting beneath the pedal and extending farther to the occupant than the region of the support surface which extends upwards on the side of the pedal. Said bead ensures a foot resting on the floor and being far away from the pedal to be restrained earlier, which is reasonable in particular in a comfort position.

The third airbag can extend widthwise transversely to plural pedals, when viewed in the longitudinal direction, and in particular can even extend over the entire width from the center tunnel to the sidewall of the vehicle.

Similar to the second airbag, the third airbag may either be a separate airbag to be inflated by a separate gas source or may have a separate flow supply to a joint gas source with the first airbag or may be a chamber of a joint airbag in which the first airbag is equally defined by a chamber (or plural chambers) of said larger airbag. Those chambers which form the first, possibly the second and, in this variant, also the third airbag are fluid-communicated with each other.

The third airbag can extend from a horizontal portion of the floor upwards to or close to a heel area of the foot of the driver resting on the associated pedal, that is, up to the lower side of the pedal. In this case, the afore-mentioned third airbag and the at least one first airbag may also be designed as a joint airbag.

The third airbag optionally has a variable maximum inflation volume, i.e., in the inflated state it can adopt different volumes and, thus, different shapes depending on the desired restraining effect and the position of the feet so as to obtain restraint adapted to the position of the feet.

The first airbag can extend laterally from a center tunnel to a floor-side lateral foot rest protruding toward the occupant compared to the remaining footwell and optionally can cover even said foot rest on the front side. Said foot rest is sort of a ramp that is tightly mounted in the vehicle and protrudes from the remaining floor in the region of the slope between the flat parts of the floor and the bulkhead. The foot that does not operate the gas pedal rests on the same.

BRIEF DESCRIPTION OF THE DRAWINGS

Further features and advantages of the invention will be evident from the following description and from the following drawings which are referred to, and wherein.

DESCRIPTION

Figure 1:
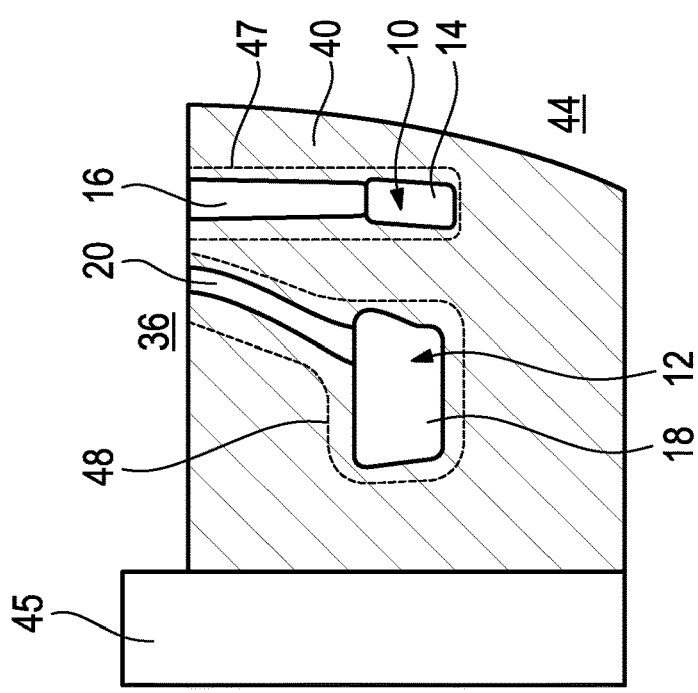
FIG. 1 shows a front view of the footwell of a vehicle comprising a foot protection device according to the invention.

In FIG. 1, a footwell for the driver of a vehicle is shown obliquely from above, comprising pedals including a gas pedal 10 and a brake pedal 12, the gas pedal having a gas pedal plate 14 and a gas pedal lever 16 on which the plate 14 is fastened. The brake pedal has a brake pedal plate 18 and a brake pedal lever 20.

Figure 2:
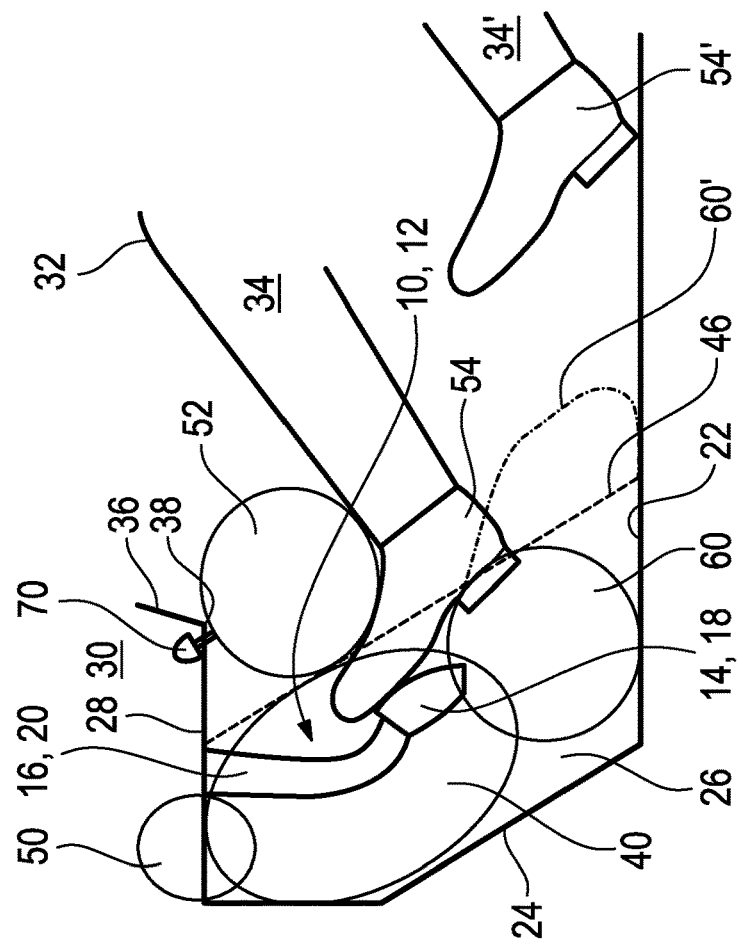
FIG. 2 shows a lateral view of the foot protection device according to the invention in the inflated state when viewing the footwell from the side.

The footwell is delimited by a substantially horizontal floor 22 from which an obliquely upward extending bulkhead 24 extends forward. In a lateral view, the footwell provided with the reference symbol 26 in FIG. 2 is delimited by a ceiling portion 28 of an instrument panel 30.

The instrument panel 30 further includes a front side 36 directed obliquely upwards in the direction of the knee 32 of the driver 34 and a transition 38 between the ceiling portion 28 and the front side 36. Said transition 38 in reality is strongly rounded and is not as angular as shown in the stylized drawing of FIG. 2.

In the shown embodiment, suspended pedals are described, i.e., the levers 16, 20 in a lateral view project downward from the ceiling portion 28. Alternatively, the levers 16, 20 can also extend through the bulkhead 24 in terms of standing pedals.

There is provided a first airbag 40 which is inflated between the bulkhead 24 and the pedals 10, 12 and which, when inflated, fills the region between a center tunnel 44 and a foot rest 45 provided at the opposite lateral end of the footwell. This means that the airbag 40 bears against the bulkhead 24.

In FIG. 1, the airbag 40 is shown in hatched lines to make it visible, although it is not cut in FIG. 1, of course.

In the inflated state, the first airbag 40, on the one hand, bears against the bulkhead 24 and, on the other hand, contacts the respective pedals 10, 12, viz. both the levers 16, 20 and the plates 14, 18 thereof.

The inflated airbag 40 should form a largely smooth support surface 46, symbolized by a broken line in FIG. 2. To achieve this, the airbag 40 encloses the pedals 10, 12 including their plates 14, 18 laterally up to the front side thereof and, optionally, may even extend forward around the plates 14, 18.

On the rear side, the airbag 40 contacts the plates 14, 18 to support the pedals 10, 12.

As an alternative to the variant in which the airbag 40 extends forward around the pedals to cover the front side thereof, the airbag 40 may be provided, on the front side, with indentations 47, 48 which are adapted to the shape of each of the pedals 10 and, resp., 12 and in which the pedals 10 and, resp., 12 are located when the airbag 40 is completely inflated. In this way, the airbag 40 with its front wall and with the front side of the plates 14, 18 forms a largely step-free support surface level with the front sides of the plates 14, 18.

Said indentations 47, 48 can be materialized by darts, intermediate walls or tethers on the airbag 40.

The first airbag 40 can be accommodated either in the region of the bulkhead 24, i.e., behind the bulkhead or in a module housing forward of the bulkhead, or above the ceiling portion 28 of the instrument panel 30.

In the embodiment shown in FIG. 2, the airbag includes an inflation mouth 50 positioned in the upper region of the airbag 40 at the ceiling portion 28, wherein it might alternatively also be placed vertically in the middle of the footwell behind the pedals 10, 12. The respective gas generator would also be provided in the region of the inflation mouth 50 or spaced apart from the inflation mouth 50, wherein, in this case, a connecting tube connects the gas generator to the inflation mouth 50.

In the inflated state of the illustrated foot protection device, there is also a second airbag 52 extending transversely to the pedals 10, 12 and behind the same (based on the driving direction) and above the same.

Said second airbag 52 is a joint airbag for all pedals 10, 12.

When viewed in a lateral view, said second airbag 52 extends preferably, which is not to be understood in a limiting sense, in the region of the transition 38.

The second airbag 52 has such a volume that it reaches close to the foot 54 of the driver 34 and in particular also contacts the foot.

The second airbag 52 may be a separate airbag having a separate gas source 70. As an alternative, the airbag 52 is fluid-communicated with the first airbag 40. A third option consists in the fact that the second airbag 52 and the first airbag 40 form a joint airbag having plural chambers. One chamber or more chambers forms or form the first airbag 40, and one or more chambers forms or form the second airbag 52, wherein all of said chambers can be fluid-communicated with each other.

The driver 34 is symbolized by a 5%, a 50% or a 95% dummy with respect to his/her dimensions.

When, in a case of restraint, the foot 54 of the said driver 34 is moved rearward or upward, either by the first airbag 40 or by a deformation of the bulkhead 24 or a movement of the pedals 10, 12 in the direction of the vehicle tail, the movement of the foot 54 is either restrained by the second airbag 52 or the movement thereof is at least damped.

There is further provided a third airbag 60 that is complementary to the first airbag 40 and extends from the floor 22 upward up to the plates 14, 18 and into a region of the heel of the foot 54 of the driver 34 so as to reduce or even prevent a downward movement of the foot 54. The first and third airbags 40 and 60 may contact each other to form the afore-mentioned smooth support surface 46.

As an option, the first airbag 40 and the third airbag 60 can complete each other to form a joint airbag, similarly to the case of the first airbag 40 and the second airbag 52. Also in this case, in a large airbag, plural chambers are provided which are fluid-communicated with each other and form the first airbag 40 and the second airbag 52.

It may also be reasonable to design the third airbag 60 to be larger than shown in FIG. 2, as the third airbag which extends from the first airbag 40 along the floor 22 extends even farther toward the associated seat. This means that said third airbag, which is shown by the reference symbol 60' and by the dot-dash line in FIG. 2, forms a kind of bead projecting toward the seat. When the foot of the occupant rests on the floor 22 in the comfort position, as this is the case with the foot 54' of the driver 34' shown on the right in FIG. 2, the airbag 60' forms an even more effective heel run-on surface, for said run-on surface is located more closely to the foot than is the case with the airbag 60. Thus, in the case of restraint, the leg is particularly prevented from straightening.

Alternatively, the third airbag has a variable maximum inflation volume, as, e.g., plural chambers are provided, a multi-stage gas generator inflates the airbag more or less strongly, and/or optionally releasable tethers are provided in its interior, just to name a few measures.

Depending on how far the occupant's feet 34, 34' are away from the bulkhead 24, viz. how the feet 34, 34' are positioned, the airbag is inflated such that it either has the volume sketched by reference symbol 60 or adopts the volume sketched by reference symbol 60'.

In one embodiment, sensors inside the vehicle detect the feet or allow conclusions of the position of the feet to appropriately inflate the airbag 60.

In an alternative embodiment, the airbag may comprise a passive venting device. Such a passive venting device includes at least one outflow opening and at least one closure element. For example, the venting device may be configured such that the outflow opening is closed by the closure element only if the feet 34' of the occupant have a particular minimum distance from the bulkhead 24. If the feet 34 have a distance smaller than the minimum distance, the passive venting device is configured so that the outflow opening is not closed by the closure element and gas can flow out through the outflow opening.

In one embodiment, for example, the closure element of the passive venting device is connected to the airbag cover via a tether. If, in this embodiment, the feet 34' have the minimum distance from the bulkhead, the airbag 60 can deploy unobstructed, thus causing the tether connected to the airbag shell to be tensioned and to pull the closure element over the outflow opening and close the latter so that the airbag adopts the volume sketched by the reference symbol 60'. If the occupant's feet 34 are close to the bulkhead 24, however, the deployment of the airbag 60 is restricted at an early stage by the feet 34 and the tether connected to the airbag shell is not tensioned. Thus, the closure element is not pulled over the outflow opening and the outflow opening remains opened. In this case, the airbag adopts the volume sketched by the reference symbol 60.

It is emphasized that the instrument panel 30 cannot only be a singular part but is composed of several parts including further covers specifically in the region of the ceiling portion 28.

Concerning the lateral extension of the airbags, it is mentioned that the first airbag 40 may also have such a width that it covers the front side of the foot rest 45.

The third airbag 60 preferably extends, when viewed in the vehicle longitudinal direction, also transversely over the entire width of the footwell.

The afore-mentioned individual features are not limited to a combination, but rather can be combined with each other at will. There are no limitations concerning the possible combinations, for the features per se offer individual advantages which may be complementary to other features.

Another invention (not shown) consists in providing the first airbag 40, of course without respective indentations, for the front passenger. Said passenger airbag has corresponding effects also for the feet and legs of the passenger. Consequently, it can be appropriately equipped just as the afore-described first airbag, except for the fact that no pedals are provided, of course. In this case, too, a second airbag 52 and/or a third airbag 60 may be provided in the same variety of variants—correspondingly fluid-communicated or not fluid-communicated with the first airbag 40 and having a smooth support surface 46 or having a bead-like projecting airbag 60'.

The invention claimed is:

1. A foot protection device for a driver of a vehicle that includes pedals, comprising an inflatable first airbag located beneath a pedal which in an inflated state is positioned between a bulkhead delimiting a footwell and the pedal, wherein the first airbag in the inflated state and in a lateral view extends from the bulkhead to a front side of the pedal and laterally encloses the pedal, the first airbag forming solely or with the front side of the pedal or pedals a step-free support wall for the feet of the occupant; and wherein the foot protection device further comprises a third airbag having a first inflated condition in which the third airbag is configured to extend even with the support wall formed by the first airbag, and a second inflated condition in which the third airbag is configured to extend beyond the support wall formed by the first airbag along a floor toward an associated seat, wherein the third airbag is configured to be inflated to the first inflated condition in response to a normal position of the driver, and wherein the third airbag is configured to be inflated to the second inflated condition in response to a comfort position of the driver.

2. The foot protection device according to claim 1, wherein the first airbag is associated with and laterally encloses plural pedals.

3. The foot protection device according to claim 1, wherein for the associated pedal or pedals the first airbag has an indentation adapted to the shape of the respective pedal which indentation in the inflated state receives the respective pedal and in which indentation the latter is embedded.

4. The foot protection device according to claim 1, wherein the at least one first airbag extends to the pedal or pedals so far that it contacts the same.

5. The foot protection device according to claim 1, wherein a second airbag is arranged inside the vehicle so that, in the inflated state, it is positioned between an instrument panel upwardly delimiting the footwell and a location configured to correspond to a location of a foot of the driver resting on the associated pedal.

6. The foot protection device according to claim 5, wherein the second airbag is a separate airbag or is in fluid communication with the first airbag.

7. The foot protection device according to claim 5, wherein the second airbag is arranged in a region of a transition of a ceiling portion upwardly delimiting the footwell to a front side of the instrument panel facing obliquely upwards in a direction configured to correspond to a location of knees of the driver and contacts said transition in the inflated state.

8. The foot protection device according to claim 5, wherein the second airbag has such a volume that it is configured to contact a foot of the driver resting on the associated pedal and, moreover, is supported on the instrument panel in a region of its upper side.

9. The foot protection device according to claim 1, characterized in that, when viewed in a vehicle longitudinal direction, the third airbag extends transversely to plural pedals.

10. The foot protection device according to claim 1, wherein the third airbag is a separate airbag or is in fluid communication with the first airbag.

11. The foot protection device according to claim 1, wherein the third airbag has a variable maximum inflation volume.

12. The foot protection device according to claim 1, wherein the first airbag extends laterally from a center tunnel to a floor-side lateral foot rest protruding toward the occupant from the remaining footwell.

13. The foot protection device according to claim 1, wherein the first airbag covers the front side of the foot rest.

14. The foot protection device according to claim 1, wherein the comfort position of the driver corresponds to a reclined position.

\* \* \* \* \*